US010136742B1

(12) United States Patent
Leslie et al.

(10) Patent No.: US 10,136,742 B1
(45) Date of Patent: Nov. 27, 2018

(54) FOOD ITEM ASSEMBLY LINE

(71) Applicant: Domino's IP Holder LLC, Ann Arbor, MI (US)

(72) Inventors: Stuart M. Leslie, Larchmont, NY (US); Jason C. Billig, Thornwood, NY (US); Daniel T. Kim, Washington Township, NJ (US); Thomas C. Van Dyk, Ramsey, NJ (US); Brooke A. Frendo, South Lyon, MI (US); Andrew B. Helmholtz, Dexter, MI (US); Michael J. Hardin, Northville, MI (US); Amber J. Gadsby, Lakeland, MI (US)

(73) Assignee: DOMINO'S IP HOLDER LLC, Ann Arbor, MI (US)

( * ) Notice: Subject to any disclaimer, the term of this patent is extended or adjusted under 35 U.S.C. 154(b) by 0 days.

(21) Appl. No.: 15/724,422

(22) Filed: Oct. 4, 2017

(51) Int. Cl.
| | |
|---|---|
| *A47F 10/06* | (2006.01) |
| *A47J 43/00* | (2006.01) |
| *G06Q 50/12* | (2012.01) |
| *G06F 3/0482* | (2013.01) |
| *B65B 25/00* | (2006.01) |

(52) U.S. Cl.
CPC .............. *A47F 10/06* (2013.01); *A47J 43/00* (2013.01); *B65B 25/001* (2013.01); *G06F 3/0482* (2013.01); *G06Q 50/12* (2013.01)

(58) Field of Classification Search
CPC .......... A47F 3/06; A47F 3/063; A47F 3/0043; A47F 7/0071; A47F 9/00; A47F 9/02; A47F 9/046; G09F 9/00; G01G 19/40; G06G 1/0005; G06Q 10/08; G06Q 10/087
See application file for complete search history.

(56) References Cited

U.S. PATENT DOCUMENTS

| | | | | | |
|---|---|---|---|---|---|
| 1,170,790 | A | * | 2/1916 | Weston | E04H 3/04 186/44 |
| 2,900,045 | A | * | 8/1959 | Conklin | A47J 36/2483 186/44 |
| 3,170,554 | A | * | 2/1965 | Davis | G07F 9/10 186/44 |
| 4,685,311 | A | * | 8/1987 | Rastelli | A47J 27/14 62/255 |
| 5,163,536 | A | * | 11/1992 | Tuhro | A47B 87/002 186/44 |
| 7,776,372 | B2 | | 8/2010 | Hrudka | |
| 2013/0101709 | A1 | | 4/2013 | Rader | |

(Continued)

OTHER PUBLICATIONS

Dana Tanyeri, Domino's Delivers a New Guest-Friendly Pizza Theater Prototype, Jan. 17, 2013, 7 Pages.

(Continued)

*Primary Examiner* — Mark J Beauchaine
(74) *Attorney, Agent, or Firm* — Brooks Kushman P.C.

(57) ABSTRACT

A food assembly line is provided for assembling a food item according to an order. The food assembly line includes multiple work stations at which the food item may be positioned, and a display system including a display device at each of the multiple work stations. The display system is configured to display information associated with the order at the display devices. The display system is further configured to update the display devices during assembly of the food item so that each display device displays at least a portion of the information when the food item is positioned proximate the display device.

29 Claims, 5 Drawing Sheets

(56) References Cited

U.S. PATENT DOCUMENTS

2013/0335328 A1* 12/2013 Greenhalgh ....... G06Q 30/0241
345/168
2015/0260566 A1 9/2015 Conder
2016/0345753 A1 12/2016 Savinskiy et al.
2017/0365017 A1* 12/2017 Ells ..................... G06Q 20/208

OTHER PUBLICATIONS

Andrew Adam Newman, How the Build-Your-Own Meal Craze Is Reshaping Restaurants, Chipotle's not the only game in town, Jun. 7, 2015, 5 Pages.

* cited by examiner

FOOD ITEM ASSEMBLY LINE

TECHNICAL FIELD

The disclosure relates to an assembly line for assembling a food item

BACKGROUND

Examples of systems for use in assembling a food items are disclosed in U.S. Patent Application Publication Nos. 2013/0101709 A1 and 2016/0345753 A1.

SUMMARY

In at least one embodiment according to the disclosure, a food assembly line is provided for assembling a food item according to an order. The food assembly line includes multiple work stations at which the food item may be positioned, and a display system including a display device at each of the multiple work stations. The display system is configured to display information associated with the order at the display devices. The display system is further configured to update the display devices during assembly of the food item so that each display device displays at least a portion of the information when the food item is positioned proximate the display device.

A food assembly line according to another aspect disclosure includes a shelf on which a food item may be positioned at multiple work stations. The food assembly line further includes multiple storage bins for storing ingredients for use in making the food item. At least some of the storage bins are positioned below and in front of the shelf.

While exemplary embodiments are illustrated and disclosed, such disclosure should not be construed to limit the claims. It is anticipated that various modifications and alternative designs may be made without departing from the scope of the disclosure.

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Figure 1:
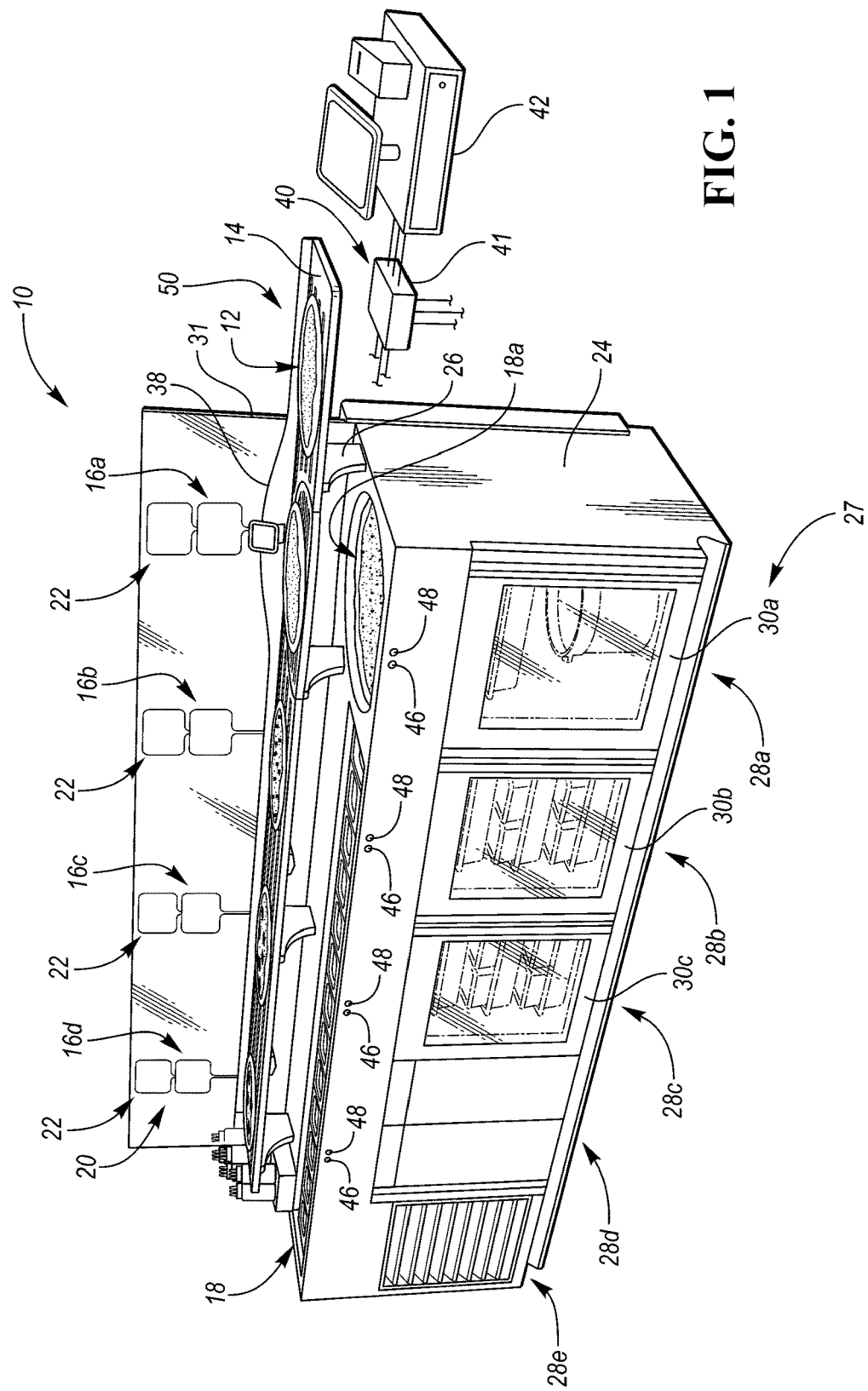
FIG. 1 is a perspective view of a food assembly line according to the present disclosure viewed from a worker side of the food assembly line, wherein the food assembly line includes a raised shelf on which a food item may be positioned at multiple work stations, multiple storage bins at one or more of the work stations for storing ingredients for use in making the food item, and a display system including one or more display devices at each of the multiple work stations for displaying information associated with the order.
Figure 2:
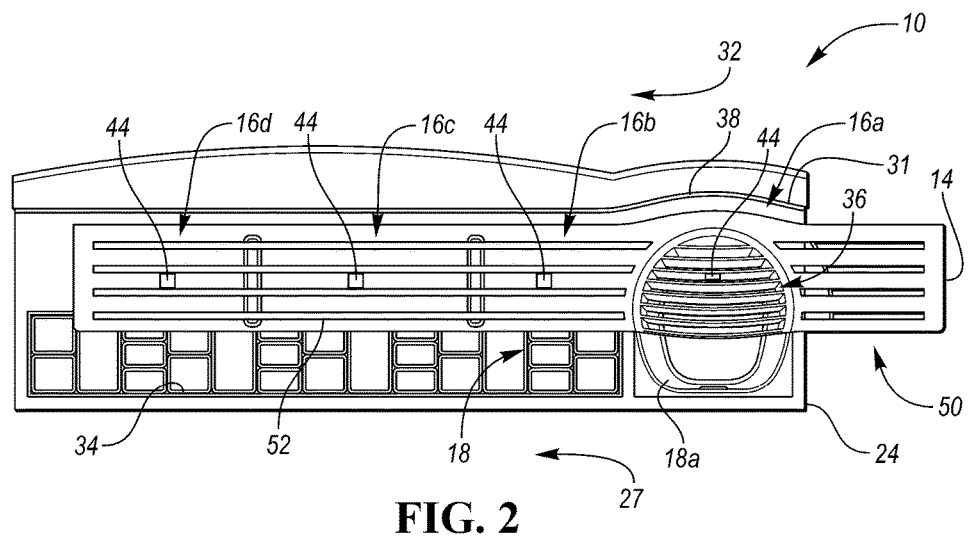
FIG. 2 is a top view of the food assembly line of FIG. 1.
Figure 3:
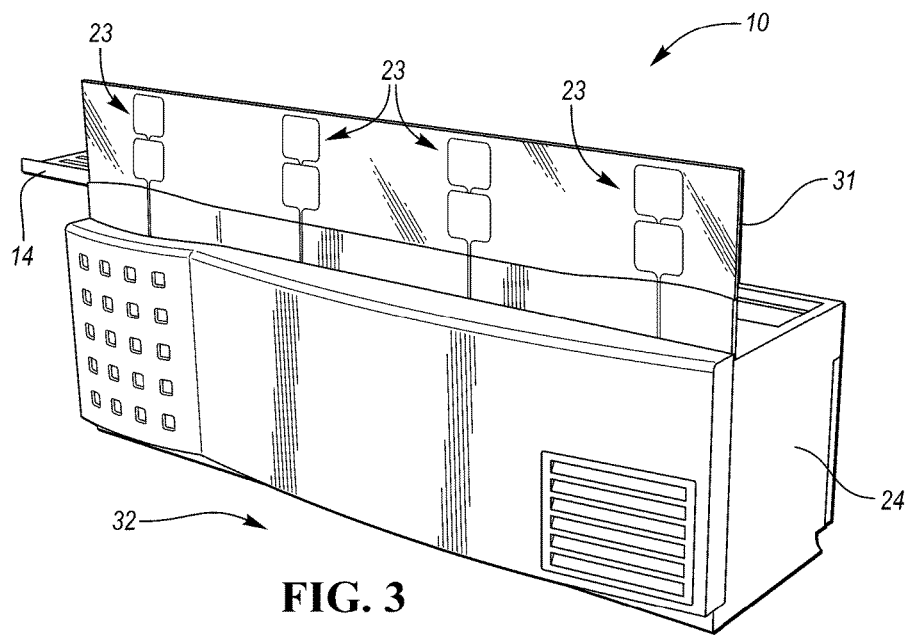
FIG. 3 is a front perspective view of the food assembly line of FIG. 1 viewed from a customer side of the food assembly line.

FIGS. 1-3 show a food assembly line 10, such as a food preparation table or apparatus, for assembling a food item 12 according to an order. For example, the food item 12 may be a pizza, and the order may be a pizza order that is placed by a customer by telephone, text, a website, direct order at a store, etc. In the embodiment shown in FIG. 1, the food assembly line 10 includes a raised counter or ledge, such as a shelf 14, on which the food item 12 may be positioned at multiple work stations 16a, 16b, 16c, 16d such as ingredient application stations. While four work stations are shown in the illustrated embodiment, the food assembly line 10 may have any suitable number of work stations, such as two, three, or more than four. The shelf 14 may also at least partially define each of the work stations 16a-d. The assembly line 10 further includes multiple ingredient bins or storage bins 18 at one or more of the work stations 16a-d for storing ingredients (e.g., meats, vegetables, cheese, etc.) for use in making the food item 12, and a display system 20 including one or more display devices 22, 23 at each of the multiple work stations 16a-d for displaying information associated with the order.

Referring to FIGS. 1 and 2, the shelf 14 may be made of any suitable material, such as plastic and/or metal, and may be mounted on any suitable support structure. In the illustrated embodiment, the shelf 14 is mounted on a base 24, such a cabinet, with multiple supports, such as vertical risers 26, so that the shelf 14 is raised above the base 24 and storage bins 18 in the range of 5 to 15 inches, for example. Furthermore, the base 24 may likewise be made of any suitable material, such as metal, wood, or plastic, and may include multiple storage areas 28 that are accessible by workers on a work side 27 of the base 24. For example, the base 24 may include one or more storage areas 28a, 28b, 28c, 28d, such as refrigerated storage areas, for storing various items, such as ingredients (e.g., meat, cheese, vegetables, etc.) for making the food item 12, and the storage areas 28a-d may be accessible by opening pivotable doors 30a, 30b, 30c, 30d. In addition, referring to FIGS. 1-3, the food assembly line 10 may include a transparent panel 31, such as a glass or plastic panel, connected to the base 24 and/or shelf 14 and configured to separate the work side 27 (e.g., work stations 16a-d) from a customer side or area 32.

Referring to FIGS. 1 and 2, the above mentioned storage bins 18 may be positioned in one or more recessed areas 34 formed in a top of the base 24. At least some of the storage bins 18 may be positioned below the shelf 14 and extend at least partially in front of the shelf 14. In the embodiment shown in FIGS. 1 and 2, the work stations 16b, 16c and 16d each include multiple storage bins 18 that are positioned below and in front of the shelf 14. With such a configuration, a worker assembling the food item 12 may have easy access to ingredients in the storage bins 18 without having to reach over the shelf 14. Furthermore, with the raised shelf 14, the food item 12 may remain visible to the customer in the customer area 32 at all times.

In the embodiment shown in FIGS. 1 and 2, the rightmost work station 16a is an ingredient application station including an ingredient bin, e.g., storage bin 18a, positioned beneath the shelf 14 for storing an ingredient for use in making the food item 12. In the illustrated embodiment, the storage bin 18a at the work station 16a also extends partially in front of the shelf 14. Furthermore, the shelf 14 has one or more openings 36 above the storage bin 18a so that during application of the ingredient on the food item 12, pieces of the ingredient that avoid the food item 12 or that do not remain on the food item 12 may fall back into the storage bin 18a. In the embodiment shown in FIGS. 1 and 2, the work station 16a is a cheese application station. The work station 16a also includes a blocking member, such as a shelf blocker 38, positioned at an outboard edge of the shelf 14 for inhibiting ingredients from passing over the outboard edge of the shelf 14.

Referring to FIGS. 1-5, the display system 20 is configured to display information associated with the order at each of the multiple work stations 16a-d so that one or more workers may properly assemble the food item 12 according to the order. The display system 20 may also be configured to display information to the customer in the customer area 32 during assembly of the food item 12.

In the illustrated embodiment, the display system 20 includes a control arrangement 40 configured to control the display devices 22, 23 at the work stations 16a-d so that the display devices 22, 23 may display information associated with the order and/or display information to the customer, as explained below in further detail. The control arrangement 40 may include one or more control units 41 that are configured to communicate with the display devices 22, 23, via direct connections (e.g., wired connections) and/or wirelessly, and that are also configured to receive input from various sources or components (e.g., sensors). The one or more control units 41 may also communicate with a point-of-sale (POS) system 42, or be provided as part of the POS system 42.

Each display device 22, 23 of the display system 20 may be any suitable display device, such as an analog or digital display device or panel (e.g., an LED, LCD, or OLED digital display device), a projection device (e.g., projector), etc., for displaying an image including information associated with the order. Furthermore, the display devices 22, 23 may be associated with the transparent panel 31. In the embodiment shown in FIG. 1, for example, each display device 22 is a thin panel display device that is mounted (e.g., adhered) on the transparent panel 31 and configured to display information toward the work side 27. Furthermore, referring to FIG. 3, each display device 23 is likewise mounted on the transparent panel 31 and is configured to display information toward the customer area 32. In another embodiment, each display device 22, 23 may comprise a projector mounted on the shelf 14, base 24 and/or transparent panel 31 and configured to display an image on the transparent panel 31.

In yet another embodiment, the display devices 22, 23 associated with a particular work station 16a, 16b, 16c, 16d may be formed as a single display device having display surfaces on opposite sides so that the display device is configured to display information on two sides of the transparent panel 31 (e.g., toward the work side 27 and toward the customer area 32). In such an embodiment, each single display device may be integrated into the transparent panel 31. For example, each single display device may be mounted in an opening formed in the transparent panel 31.

The display system 20 may further include a scale 44 (e.g., load sensor or force transducer) at at least one of the work stations 16a, 16b, 16c, 16d for weighing the food item 12 before, during, or after application of one or more ingredients at the at least one work station 16a, 16b, 16c, 16d. In the embodiment shown in FIG. 2, the display system 20 includes a scale 44 at each work station 16a-d. Furthermore, the scales 44 may provide input to the control arrangement 40, so that weight information may be displayed on the display devices 22 and/or 23.

Figure 4:
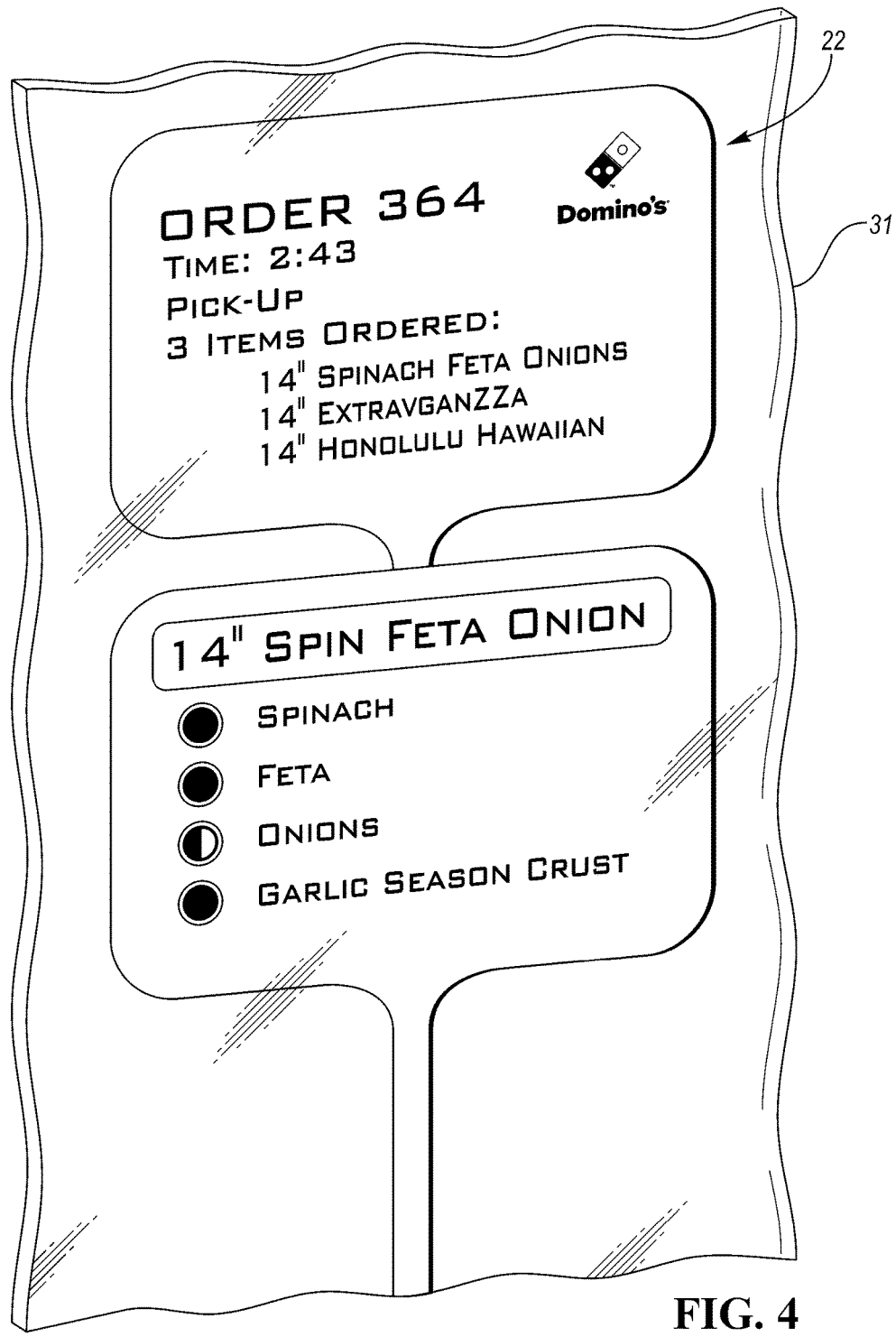
FIG. 4 shows a display for one of the display devices that is viewable from a work side of the assembly line, and including example information that may be displayed on the display device.

FIG. 4 shows a display image for one of the display devices 22, including example information that may be displayed on the display device 22 at a particular work station 16a, 16b, 16c, 16d. That information may include, for example, one or more of the following: order identifier (e.g., order number), time, order type (e.g., pick-up, delivery, etc.), item(s) ordered (e.g., pizza with various specified toppings), portion amount for each ingredient (e.g., weight or piece count), weight of the food item 12 at the particular work station 16a, 16b, 16c, 16d, etc. That same information may be displayed at each display device 22 as the food item 12 moves along the shelf 14 or the information may be tailored for the associated work station 16a, 16b, 16c, 16d. For example, the display device 22 at the work station 16a may display desired or target weight of cheese to be applied to the food item 12, but not display desired or target amounts of any other ingredients or toppings to be added to the food item 12. Similarly, each display device 22 at each particular work station 16b, 16c, or 16d may display desired or target portion amounts of ingredients associated with the particular work station, but not display desired or target portion amounts of ingredients associated with the other work stations. Therefore, each display device 22 may display only a portion of the information associated with a particular order.

Figure 5:
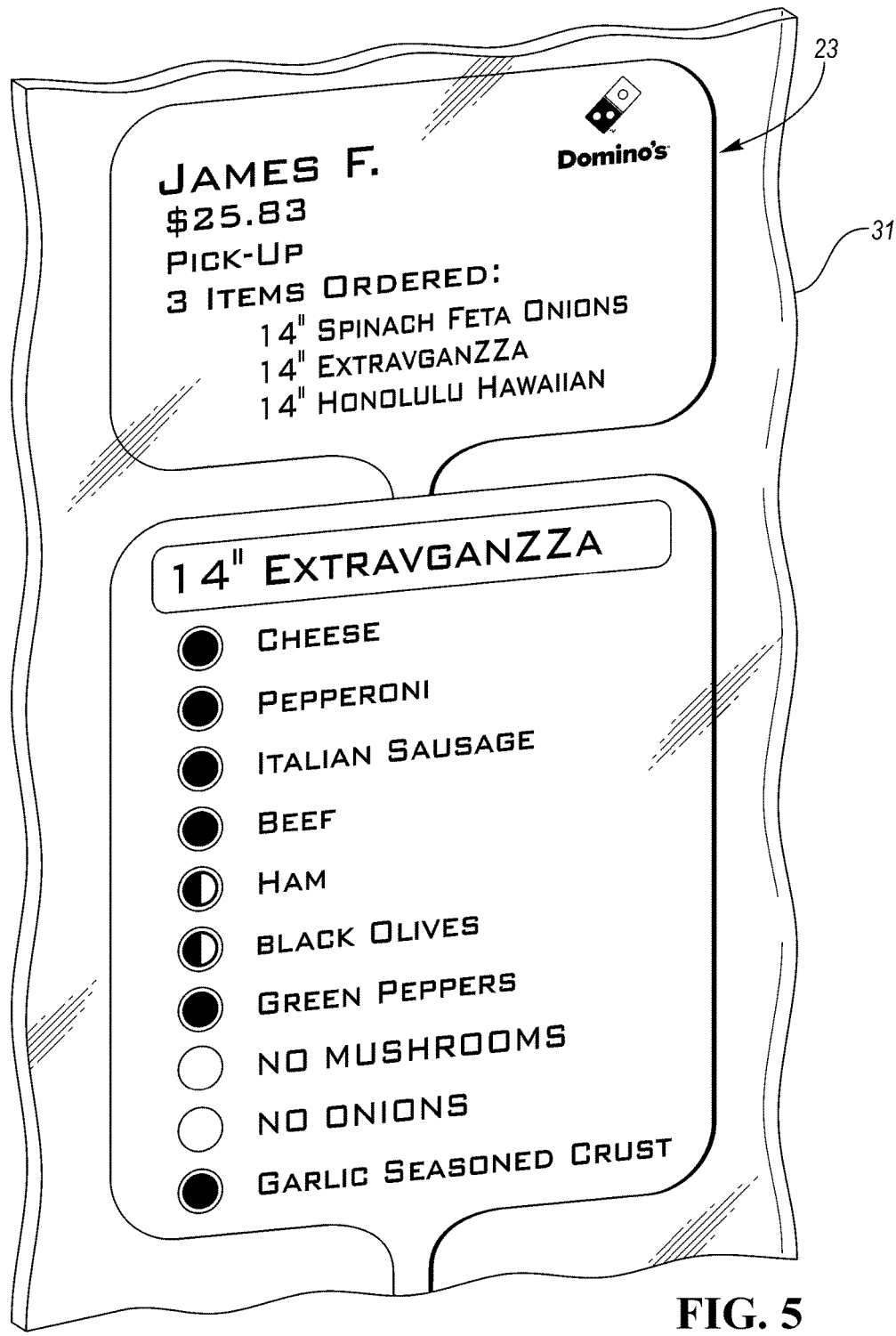
FIG. 5 shows a display for one of the display devices that is viewable from a customer side of the assembly line, and including example information that may be displayed on the display device.

FIG. 5 shows a display image for one of the display devices 23, including example information that may be displayed on the display device 23. That information may include, for example, one or more of the following: customer name, cost of order, time, order type (e.g., pick-up, delivery, etc.), item(s) ordered (e.g., pizza with various specified toppings), etc. Furthermore, that information may be viewable by customers in the customer area 32 as the food item 12 is moved along the shelf 14.

The control arrangement 40 may be configured to update the display devices 22 and/or 23 in any suitable manner so that the display devices 22 and/or 23 may each display information corresponding to a particular order when the food item 12 associated with that particular order is positioned proximate the display device(s) 22, 23 of a particular work station 16a, 16b, 16c, 16d. For example, the control arrangement 40 may be configured to update the display device 22 at one of the work stations 16a, 16b, 16c, or 16d when the food item 12 is removed from the scale 44 at the one work station 16a, 16b, 16c, or 16d, and moved toward the next work station along the assembly line 10, so that the display device 22 at that one work station 16a, 16b, 16c, 16d then displays information associated with another food item order (e.g., the next order in a queue). Likewise, the control arrangement 40 may be configured to update each display device 22 at each work station 16a, 16b, 16c, 16d when the food item 12 is removed from the scale 44 at the respective work station 16a, 16b, 16c, or 16d, so that the display device 22 at the respective work station 16a, 16b, 16c, or 16d then displays information associated with another food item order (e.g., then next order in a queue). In addition, the control arrangement 40 may be configured to update each display device 23 in a similar manner. With such a configuration, the display devices 22 and 23 may be updated as a particular food item 12 is moved along the shelf 14 so that each display device 22, 23 may display information associated with the corresponding order when the food item 12 is positioned proximate the display device 22, 23 (e.g., when the food item 12 is positioned at the work station 16a, 16b, 16c, or 16d associated with the display device 22, 23).

As another example, the control arrangement 40 may be configured to update the display devices 22, 23 at one or more of the work stations 16a-d based on a voice command. As a more specific example, the control arrangement 40 may include one or more voice sensors 46 (e.g., a voice sensor at each work station 16a-d) that are configured to sense verbal commands by one or more workers at the work stations 16a-d, and that communicate with the one or more control units 41 so that the one or more control units 41 may update the display devices 22, 23 based on the verbal commands.

As yet another example, the control arrangement 40 may be configured to update the display devices 22, 23 at one or more of the work stations 16a-d based on a gesture. As a more specific example, the control arrangement 40 may include one or more motion or gesture sensors 48 (e.g., a gesture sensor at each work station 16a-d) that are configured to sense movement commands by one or more workers at the work stations 16a-d, and that communicate with the one or more control units 41 so that the one or more control units 41 may update the display devices 22, 23 based on the movement commands.

Referring to FIGS. 1-5, a method of utilizing the assembly line 10 to assemble a food item 12 will now be described in more detail. First, an order for the food item 12 may be received at, or entered into, the POS system 42. As mentioned above, the order may be placed by a customer by telephone, text, a website, direct order at a store, etc. For a pizza order, order information may then be communicated (e.g., via the control arrangement 40) to a display device at a dough table (not shown), so that suitable pizza dough may be prepared or selected for the order. For example, if the order is for a medium pizza, a medium-sized dough may be prepared (e.g., stretched) and positioned on a pan or screen at the dough table. Pizza sauce may also be added to the dough at the dough table, and then the dough may be transferred to a receiving area 50 on the shelf 14. The dough at the receiving area 50 in FIG. 1 is identified as food item 12. It should be noted that the food item 12 may represent the pizza at all stages of preparation.

When the dough leaves the dough table, or is positioned at the receiving area 50, or is moved along the shelf 14 to the work station 16a, the display system 20 may function to automatically update the display device 22 at the work station 16a to show order information associated with that particular food item 12. Furthermore, when the scale 44 at the work station 16a detects presence of the food item 12, that information may be communicated to the control arrangement 40 so that the control arrangement 40 may cause the display device at the dough table to display the next order in the queue.

A worker at the work station 16a may then add cheese to the food item 12 until a detected weight by the scale 44 at the work station 16a matches or otherwise corresponds to a specified product weight displayed on the display device 22 at the work station 16a. Next, the food item 12 may be moved along the shelf 14 to the next work station 16b. As shown in FIGS. 1 and 2, the shelf 14 may include rails 52 to facilitate sliding of the food item 12 along the shelf 14.

As mentioned above, the display device 22 at the work station 16a may be updated in any suitable manner to show the next order in the queue. For example, when the food item 12 is moved off of the scale 44 at the work station 16a, the scale 44 may automatically zero out, and the control arrangement 40 of the display system 20 may function to cause the display device 22 at the work station 16a to display information associated with the next order in the queue. As another example, the worker at the work station 16a may provide a voice command, such as "show next order," that is detected by a voice sensor 46 at the work station 16a and communicated to the control arrangement 40 in order to cause the control arrangement 40 to automatically update the display device 22 at the work station 16a to display information associated with the next order in the queue. As yet another example, the worker at the work station 16a may provide a gesture command, such as a side-to-side hand movement, that is detected by a movement sensor 48 at the work station 16a and communicated to the control arrangement 40 in order to cause the control arrangement 40 to automatically update the display device 22 at the work station 16a to display information associated with the next order in the queue.

If the food item 12 is the first order of the day, or the first order after a period of inactivity, then the action used to update the display device 22 at the work station 16a may also cause the control arrangement 40 to update the display device 22 at the work station 16b to show order information associated with food item 12, so that the display device 22 at the work station 16b may display appropriate order information when the food item 12 is positioned proximate the display device 22 at the work station 16b. As another example, if the food item 12 is the first order of the day, or the first order after a period of inactivity, then the control arrangement 40 may cause the display devices 22 at all of the work stations 16a-d to display order information associated with the food item 12 until each display device 22 is updated in the same or similar manner as described above to show the next order in the queue.

The above process may continue at each work station 16b, 16c, 16d until the food item 12 is completely assembled. Furthermore, the display devices 22 at the work stations 16b-d may each be updated in a similar manner as described above with respect to the display device 22 at the work station 16a. Likewise, the display device 23 at each work station 16a, 16b, 16c, 16d may be automatically updated at the same time the corresponding display device 22 is updated.

Those skilled in the art will appreciate that the display devices 22, 23, the control arrangement 40 (e.g., the one or more control units 41), the POS system 42, and any other system, subsystem, or device described herein may individually, collectively, or in any combination comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

Figure 6:
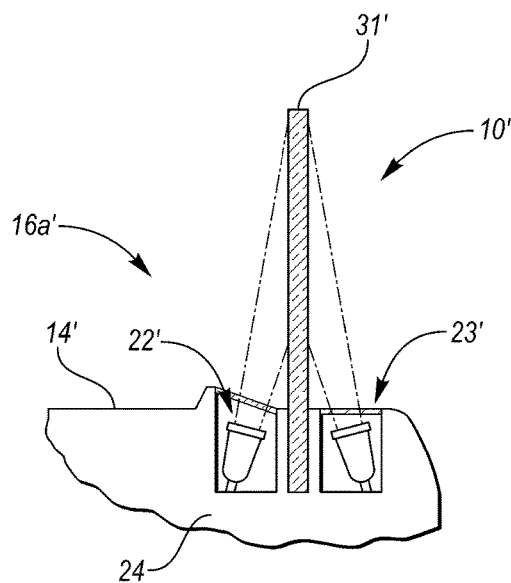
FIG. 6 is a cross-sectional view of a second embodiment of a food assembly line according to the disclosure.

FIG. 6 shows another embodiment 10' of a food assembly line according to the disclosure. The assembly line 10' is similar to the assembly line 10 and similar features are identified with the same reference numbers, except that the reference numbers for the assembly line 10' each include a prime mark. As shown in FIG. 6, the assembly line 10' includes display devices 22' and 23' that each comprise a projector for projecting an image onto transparent panel 31'. Although only work station 16a' is shown in FIG. 6, each work station of the assembly line 10' may include similar display devices. Furthermore, each display device 22', 23' may display similar information as discussed above with respect to the assembly line 10, and the display devices may be updated as discussed above with respect to the assembly line 10.

Figure 7:
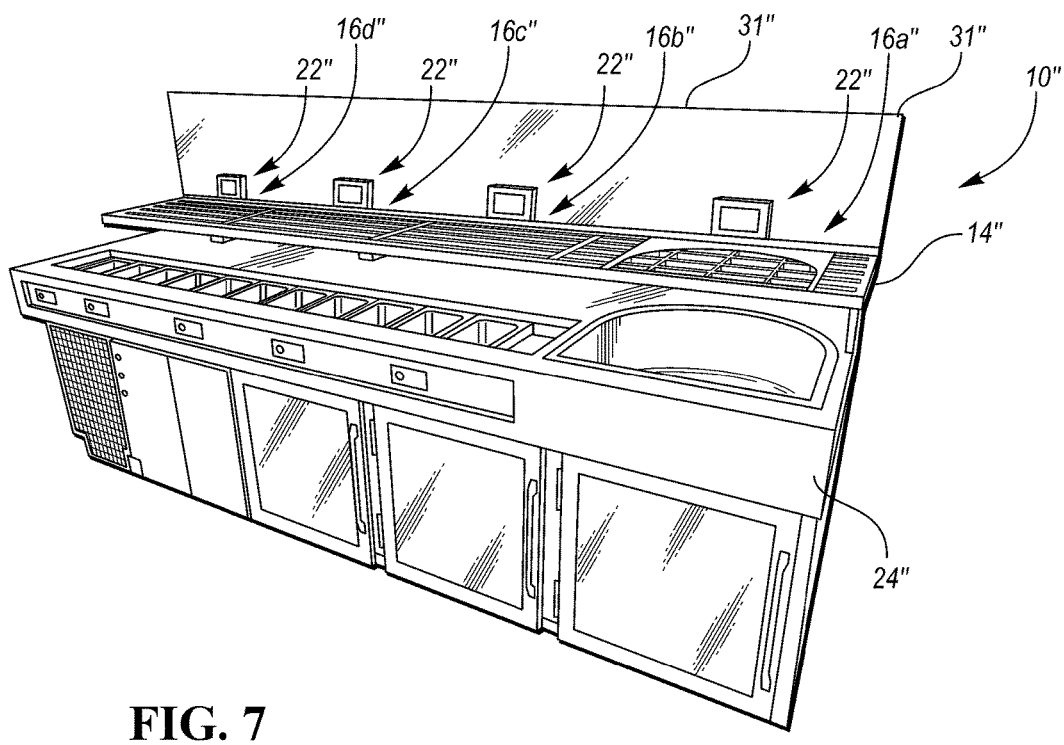
FIG. 7 is a perspective view of a third embodiment of a food assembly line according to the disclosure.

FIG. 7 shows yet another embodiment 10" of a food assembly line according to the disclosure. The assembly line 10" is similar to the assembly line 10 and similar features are identified with the same reference numbers, except that the reference numbers for the assembly line 10" each include a double prime mark. As shown in FIG. 7, the assembly line 10" includes display devices 22" that are mounted directly to shelf 14"

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A food assembly line for assembling a food item according to an order, the food assembly line comprising:
    multiple work stations at which the food item may be positioned; and
    a display system including an image-display device at each of the multiple work stations, wherein the display system is configured to display information associated with the order at the image-display devices, and wherein the display system is configured to update the display devices during assembly of the food item so that each image display device displays at least a portion of the information when the food item is positioned proximate the image display device.

2. The food assembly line of claim 1 wherein at least one of the image display devices comprises a digital image-display device.

3. The food assembly line of claim 1 wherein at least one of the image-display devices comprises a projector.

4. The food assembly line of claim 1 further comprising a transparent panel configured to separate the work stations from a customer area.

5. The food assembly line of claim 4 wherein the image-display devices are associated with the transparent panel.

6. The food assembly line of claim 5 wherein at least one of the image-display devices is mounted on the transparent panel.

7. The food assembly line of claim 5 wherein at least one of the image-display devices is configured to project an image on the transparent panel.

8. The food assembly line of claim 5 wherein at least one of the image-display devices is configured to display an image on each of two sides of the transparent panel.

9. The food assembly line of claim 5 wherein the display system includes an additional image-display device at one of the work stations, wherein the image-display device at the one work station is configured to display an image for viewing by a worker at the one work station, and the additional image-display device is configured to display an image for viewing by a customer in the customer area.

10. The food assembly line of claim 5 wherein the display system includes an additional image-display device at each of the work stations, wherein the image-display device at each work station is configured to display an image for viewing by a worker at the work station, and the additional image-display device at each workstation is configured to display an image for viewing by a customer in the customer area.

11. The food assembly line of claim 1 further comprising a scale at at least one of the work stations for weighing the food item at the at least one work station.

12. The food assembly line of claim 11 wherein the display system is configured to update the image-display device at the at least one work station when the food item is removed from the scale, so that the image-display device displays information associated with another food item order.

13. The food assembly line of claim 1 wherein the display system comprises a control arrangement configured to update the image-display device at at least one of the work stations based on a voice command.

14. The food assembly line of claim 1 wherein the display system comprises a control arrangement configured to update the image-display device at at least one of the work stations based on a gesture.

15. The food assembly line of claim 1 further comprising a shelf that at least partially defines each of the work stations.

16. The food assembly line of claim 15 wherein at least one of the work stations comprises a storage bin for storing an ingredient for use in making the food item, and wherein the storage bin is located beneath and at least partially in front of the shelf.

17. The food assembly line of claim 15 wherein one of the work stations is an ingredient application station including an ingredient bin for storing an ingredient positioned beneath the shelf, and wherein the shelf has one or more openings above the bin so that during application of the ingredient on the food item, pieces of the ingredient that do not remain on the food item fall back into the bin.

18. The food assembly line of claim 17 wherein the ingredient application station is a cheese application station.

19. A food assembly line comprising:
    a shelf on which a food item may be positioned at multiple work stations; and
    multiple storage bins for storing ingredients for use in making the food item, wherein at least some of the storage bins are positioned below and in front of the shelf so that ingredients are accessible from the at least some of the storage bins during assembly of the food item and without moving the at least some of the storage bins;
    wherein one of the multiple work stations is an ingredient application station including an ingredient bin for storing an ingredient positioned beneath the shelf, and wherein the shelf has one or more openings above the ingredient bin so that during application of the ingredient on the food item, pieces of the ingredient that do not remain on the food item fall back into the ingredient bin.

20. The food assembly line of claim 19 wherein the ingredient application station is a cheese application station.

21. The food assembly line of claim 19 wherein the multiple storage bins include a first storage bin for storing a first ingredient, and a second storage bin for storing a second ingredient, and wherein the first and second storage bins are arrangeable so that the first ingredient is accessible from the first storage bin, without moving the first storage bin, when the food item is positioned at one of the multiple work stations, and the second ingredient is accessible from the second storage bin, without moving the second storage bin, when the food item is positioned at another of the multiple work stations.

22. The food assembly line of claim 19 further comprising a transparent panel configured to separate the work stations from a customer area, and a display device at at least one of the work stations that is configured to display an image on the transparent panel that includes information associated with a food item order.

23. The food assembly line of claim 19 further comprising a transparent panel configured to separate the work stations from a customer area, and a display device at at least one of the work stations that is mounted on the transparent panel, wherein the display device at the at least one work station is configured to display information associated with a food item order.

24. A food assembly line for assembling a food item according to an order, the food assembly line comprising:
   a shelf on which the food item may be positioned at multiple work stations;
   multiple storage bins at at least two of the work stations for storing ingredients for use in making the food item, at least some of the storage bins being positioned below and in front of the shelf so that ingredients are accessible from the at least some of the storage bins during assembly of the food item and without moving the at least some of the storage bins;
   a scale at at least one of the work stations for weighing the food item before, during, or after application of one or more ingredients at the at least one work station; and
   a display system including a display device at each of the multiple work stations, and a control arrangement configured to control the display devices so that the display devices display information associated with the order, wherein the display system is configured to update the display devices as the food item is moved along the shelf so that each display device displays at least a portion of the information when the food item is positioned proximate the display device, and wherein the control arrangement is configured to update the display device at the at least one work station when the food item is removed from the scale at the at least one work station, so that the display device at the at least one work station displays information associated with another food item order.

25. A food assembly line for assembling a food item according to an order, the food assembly line comprising:
   multiple work stations at which the food item may be positioned;
   a transparent panel configured to separate the work stations from a customer area; and
   a display system including a display device at each of the multiple work stations, at least one of the display devices being mounted on the transparent panel, wherein the display system is configured to display information associated with the order at the display devices.

26. A food assembly line comprising:
   multiple work stations at which a food item may be positioned;
   a transparent panel configured to separate the work stations from a customer area; and
   a display device at at least one of the work stations that is configured to display an image on the transparent panel that includes information regarding a food item order.

27. The food assembly line of claim 26 further comprising a shelf on which the food item may be positioned at the multiple work stations, and multiple storage bins for storing ingredients for use in making the food item, wherein at least some of the storage bins are positioned below and in front of the shelf so that ingredients are accessible from the at least some of the storage bins during assembly of the food item and without moving the at least some of the storage bins.

28. A food assembly line comprising:
   multiple work stations at which a food item may be positioned;
   a transparent panel configured to separate the work stations from a customer area; and
   a display device at at least one of the work stations that is mounted on the transparent panel, wherein the display device at the at least one work station is configured to display information regarding a food item order.

29. The food assembly line of claim 28 further comprising a shelf on which the food item may be positioned at the multiple work stations, and multiple storage bins for storing ingredients for use in making the food item, wherein at least some of the storage bins are positioned below and in front of the shelf so that ingredients are accessible from the at least some of the storage bins during assembly of the food item and without moving the at least some of the storage bins.

* * * * *